United States Patent [19]

Sekhar et al.

[11] Patent Number: 5,766,458
[45] Date of Patent: Jun. 16, 1998

[54] MODULATED AND REGENERATIVE CERAMIC FILTER WITH INSITU HEATING ELEMENT

[75] Inventors: Jainagesh A. Sekhar; Vikas Gupta; Srinivas Penumella, all of Cincinnati, Ohio

[73] Assignee: Micropyretics Heaters International, Inc., Cincinnati, Ohio

[21] Appl. No.: 353,727

[22] Filed: Dec. 12, 1994

Related U.S. Application Data

[60] Continuation-in-part of Ser. No. 297,023, Aug. 29, 1994, Pat. No. 5,590,383, which is a division of Ser. No. 30,586, Mar. 12, 1993, abandoned.

[51] Int. Cl.[6] .................... B01D 46/00; B01D 35/18; F01N 3/00
[52] U.S. Cl. .................... 210/184; 55/301; 55/523; 55/DIG. 30; 60/311; 114/270; 123/198 R; 180/313; 181/231; 422/177
[58] Field of Search .................... 55/282, 301, 302, 55/309, 523, DIG. 30; 210/97, 106, 184, 185, 186, 407, 490, 510.1; 264/42, 43, 44; 427/227, 245, 247, 314, 315, 318–320; 501/80

[56] References Cited

U.S. PATENT DOCUMENTS

| | | |
|---|---|---|
| 4,400,352 | 8/1983 | Rehnberg et al. |
| 4,485,622 | 12/1984 | Takagi et al. ............................ 60/311 |
| 4,867,768 | 9/1989 | Wagner et al. ........................ 181/231 |
| 4,868,841 | 9/1989 | Affleck et al. |
| 5,001,899 | 3/1991 | Santiago et al. |
| 5,015,381 | 5/1991 | Elion et al. |
| 5,094,075 | 3/1992 | Berendes |
| 5,200,154 | 4/1993 | Harada et al. ............................ 55/523 |
| 5,205,850 | 4/1993 | Jenrich et al. ........................ 55/350.1 |
| 5,234,668 | 8/1993 | Harada et al. ............................ 55/523 |
| 5,279,737 | 1/1994 | Sekhar et al. |
| 5,334,570 | 8/1994 | Beauseigneur et al. |
| 5,342,591 | 8/1994 | Pfefferie |
| 5,376,610 | 12/1994 | Takahata et al. |
| 5,423,904 | 6/1995 | Dasgupta ............................ 55/523 |
| 5,436,216 | 7/1995 | Toyao et al. ........................ 55/DIG. 30 |
| 5,446,264 | 8/1995 | Kondo et al. ........................ 55/DIG. 30 |
| 5,470,364 | 11/1995 | Adlietta ............................ 55/523 |
| 5,472,462 | 12/1995 | Pischinger et al. ........................ 55/523 |

FOREIGN PATENT DOCUMENTS

| | | | |
|---|---|---|---|
| 92/05857 | 4/1992 | WIPO | ................................ 210/184 |

OTHER PUBLICATIONS

Mechanical Engineering, *Reducing tailpipe emissions with catalytic converters*, Ashley, vol. 116/No. 11, Nov. 1994, pp. 81–82.

Developments in Diesel Particulate Control Systems, *Open-Pore Ceramic Foam as Diesel particulate Filter*, Mizrah, Maurer, Gauckler and Gabathuler, (Switzerland) pp. 19–27, no date.

Applied Catalysis B: Environmental, 3, *Preparation, activity and durability of promoted platinum catalysts for automotive exhaust control*, Gonzalez–Velasco, Entrena, Gonzalez–Marcos, J.L. Gutierrez–Ortiz, and M.A. Gutierrez–Ortiz, 1994 Elsevier Science B.V., pp. 191–204.

(List continued on next page.)

*Primary Examiner*—Joseph W. Drodge
*Attorney, Agent, or Firm*—Dinsmore & Shohl, L.L.P.

[57] ABSTRACT

A modular filter for removing particulate matter from gases or liquids is disclosed. The filter includes at least two porous ceramic or ceramic composite modules and a heater structure for regenerating the modules by heating which is integral with the modules. The regenerating structure may also be a ceramic structure. The filter modules may be manufactured using micropyretic synthesis and manufactured to have interconnected porosity. The filter may be used to remove particulates from the exhaust of engines such as engines of land and water vehicles.

25 Claims, 8 Drawing Sheets

OTHER PUBLICATIONS

Catalysis Today, 10, *Purification of Diesel Exhaust Gas*, Saito and Ichihara, 1991 Elsevier Science Publishers B.V., pp. 45–56.

*Evaluation of a Stacked Element Diesel particulate Trap Using a newly Developed Membrane Covered Ceramic Foam Filtering Media*, Helferich and Schenck, The Duriron Company, Inc., no date.

The Economist Newspaper Ltd., *Gassing truckers*, Business, finance and science, Science and Technology, p. 97 (UK Edition), Jan. 1990.

*Regeneration performance of a Catalyzed Versus a Non-Catalyzed Ceramic Membrane Diesel particulate Trap*, Helferich (Corcona, Inc.), Yoshida and Ogasawara (Rikon Corp.) pp. 121–134, no date.

Fuel, 1989, vol. 68, July, *Exhaust emission reduction from a heavy duty diesel truck, using a catalyst and a particulate trap*, Westerholm, Hang, Egeback and Gragg, pp. 856–860.

*Start Catalyst Systems Employing Heated Catalyst Technology for Control of Emissions from Methanol-Fueled Vehicles*, Hellman, Piotrowski, and Schaefer, U.S. Environmental Protection Agency, pp. 105–122, no date.

*Diesel Particulate Control Around the World*, Walsh and Bradow, pp. 1–17, no date.

Exhaust Gas Purifiers, *Engelhard Exceptional Technologies, Environmental Protection from the Pioneers in Applied Catalytic Technology*, 1991 various pages.

PTX Exhaust Gas Purifiers, Engelhard Exceptional Technologies, 1991 various pages.

Oberland Particle Filter, *Mode of Operation and Structure*, pp. 1–6, 1992.

Zeuna Starker, Regeneration Systems: Filter Regeneration, various pages, no date.

"Review self-propagating high-temperature synthesis", J. Subrahmanyam et al., Combustion Synthesis Group, Defence Metallurgical Research Laboratory, Hyderabad 500258, India, 1992, Chapman & Hall pp. 6249–6273.

MODULATED AND REGENERATIVE CERAMIC FILTER WITH INSITU HEATING ELEMENT

This application is a continuation-in-part application of application Ser. No. 08/297,023, filed Aug. 29, 1994, now U.S. Pat. No. 5,590,383 which application is a divisional application of application Ser. No. 08/030,586 filed Mar. 12, 1993, now abandoned.

FIELD OF THE INVENTION

The invention relates to a new and improved filtering device for optimizing purification of gaseous, liquid and particulate matter, particularly in exhaust emissions aftertreatment systems, using micropyretically manufactured ceramic or ceramic composite structures in a modulated design. This invention also relates to a filter regeneration device and method using an integral heating element made in situ with the filtering device.

BACKGROUND OF THE INVENTION

During the last few years, several studies have evaluated the health risks associated with exposure to engine exhaust emissions. As a result of these studies, increasing government and health organizations have decided to tighten the standards which apply to engine-run vehicles, their fuels and their particulate and gaseous emissions.

On Nov. 15, 1990, the President of the United States signed into law the Clean Air Act Amendments of 1990. Beginning in 1994, the new law sets a performance criteria, particularly requiring buses operating more than 70 percent of the time in large urban areas (using any fuel) to cut particulates by 50 percent compared to conventional heavy duty vehicles. Also, beginning in 1994, the Environmental Protection Agency began requiring a yearly testing to determine whether buses subject to the standard are meeting the standard in use over their full useful life. Similar provisions exist in other countries and a global effort is underway to find exhaust filters and cleaning devices. In this regard, several countries in the first and third world have been actively cooperating to reduce emissions from exhaust systems. Essentially, this provision allows the use of exhaust aftertreatment devices to reduce particulate emissions to a very low level provided that they work in the field.

Because of the financial and logistical concerns with alternative fuels, transit authorities and bus engine manufacturers are seriously considering aftertreatment systems such as trap-oxidizer technology to meet 1993/94 EPA laws and regulations. Bus engines, for example, run on a stop-and-go cycle which forces the engines to operate with a dirty and sooty exhaust. Second, these vehicles operate in dense population areas and hence, bus exhaust and pollution is considered a greater health hazard than over-the-road trucks. Third, environmentalists would like to be as clean as possible even if it means going beyond EPA regulations. All of these factors make trap oxidizer technology very attractive, provided that its long-term durability can be proven and made available at reasonable costs.

The 1993/94 EPA law and regulations are only the first step in a series of ever-tightening regulations to follow. For the diesel engines industry, the next step in regulation occurs in 1998, when the laws require tighter $NO_x$ control. Even though $NO_x$ reduction for 1994 levels will be achieved by improved engine design, it is generally accepted that to meet the 1998 levels of 4 g/Bhp-h $NO_x$, diesel engines will have to use aftertreatment systems. As the $NO_x$ level is reduced, however, the particulate level increases. Hence, in trying to meet the 1998 low $NO_x$ levels, engine manufacturers are faced with increased particulates, which require further use of aftertreatment devices such as converters and traps.

Aftertreatment devices of the present invention made of the ceramic substrates and filters, as well as the micropyretically processed heating elements provide improved converters and trap systems which offer the flexibility, efficiency, and cost-effectiveness needed to meet the challenges presented by near-term (1994) and medium-term (1998) diesel emissions regulations. "Micropyretics" or "micropyretically synthesized" as used herein refers to self propagating high temperature synthesis as discussed in the review article by Subrahmanyam et al., in The Journal of Micromolecular Science at Vol. 27, p.p. 6249–6273 (1992).

The filters used in aftertreatment trap systems are the core of the system and great efforts are being made to fine-tune the existing systems to improve their effectiveness and durability. One of the problems of the current technology is the need for optimization of the filter structure, as in a modulated design. Another problem of the current technology is that the filter materials are not optimally thermally shock resistant nor are they highly thermally cyclable, as in reticulated micropyretically manufactured materials.

Presently, most of the available aftertreatment trap systems are based on the cellular cordierite ceramic monolith trap. These traps have not been efficient at collecting soot, and a large fraction of the particulate soluble organic fraction (SOF), and have several other limitations and leave much room for improvement.

For example, the straight channeled ("honey-comb") structure of the filters does not optimize stream line distortion nor surface area for particulate collection. Further, the dense wall cordierite ceramic used in today's filters is expensive.

The above described need for improved aftertreatment systems led to the invention of an alternative trap technology which was provided by the ceramic fiber coil traps developed by Mann and Hummel and Daimler Benz in West Germany. These traps were composed of a number of individual filtering elements, each of which consisted of a number of thicknesses of silica fiber yarn wound on a punched metal support. A number of those filtering elements were suspended inside a large metal can to make up a trap. However, failures during German field demonstrations appear to have reduced or eliminated work on that system, according to "Diesel Particulate Control Around the World," Michael P. Walsh et al. part of "Global Developments in Diesel Particulate Control" P-240, publ. SAE, Inc. (February 1991).

Numerous other trapping media have also been tested or proposed, including ceramic foams, corrugated mullite fiber felts, and catalytic coated stainless steel wire mesh.

In addition to the problems of the presently available aftertreatment systems addressed above, the high concentration of soot per unit of volume in the ceramic monolith of the cellular trap makes these traps sensitive to "regeneration" conditions. Trap loading, temperature, and gas flow rates must be maintained within a fairly narrow window. Otherwise, the trap fails to "regenerate" fully, or cracks or melts to overheating because the high temperature gradients in the filter monolith damage the cordierite structure.

The most challenging problem of trap oxidizer system development has been with the process of "regenerating" the filter by burning off the accumulated particulate matter. Initiating and controlling the regeneration process to ensure reliable regeneration without damage to the trap is the central engineering problem of trap oxidizer development today. The reason is that over time, the filter becomes loaded with the soot it has trapped and must be cleaned or "regenerated". The process of regeneration burns or "oxidizes" the soot collected within the filter. The cleaned filter can be used many times provided it can be successfully regenerated many thousands of times over its lifetime without failure. Many different regeneration concepts are being tested. They range from primitive off-board regeneration of the filter in an external oven to sophisticated on-board automatic electrical or burner regeneration systems using electronic controls and include catalytic injection systems. These approaches to regeneration can generally be divided into two groups: passive systems and active systems. Passive systems must attain the conditions required for regeneration during normal operation of the vehicle. Active systems, on the other hand, monitor the build up of particulate matter in the trap and trigger specific actions leading to regeneration when needed.

Passive regeneration systems face special problems on heavy duty vehicles. Exhaust temperatures from heavy duty diesel engines are normally low, and recent developments such as charge air cooling and increased turbo charger efficiency are reducing them still further. Under some conditions, it would be possible for a truck driver to drive for many hours without exceeding the exhaust temperature (around 400°–450° C.) required to trigger regeneration.

Active systems, on the other hand, are generally expensive, often requiring complex logic and electonics to initiate regeneration.

Engine and catalysts manufacturers have experimented with many catalytic converters and with a wide variety of regenerative catalytic traps. Precious metal catalytic traps are effective in oxidizing gaseous hydrocarbons and CO as well as the particulate SOF but are relatively ineffective in preventing soot oxidation, a particular problem for diesel engines. Moreover, these metals also promote the oxidation of $SO_2$ to particulate sulfates such as sulfuric acid ($H_2O_4$). Base metal catalytic traps, in contrast, are effective in promoting soot oxidation, but have little effect on hydrocarbons, CO, NO or $SO_2$. Another disadvantage of precious metal catalysts is that they are very expensive.

Unlike a catalytic trap, however, a flowthrough catalytic converter does not collect most of the solid particulate matter, which simply passes through in the exhaust. The particulate control efficiency of the catalytic converter is, of course, much less than that of a trap. One of the major disadvantages of the catalytic converter is the same as with the precious metal catalytic particulate trap: sulfate emissions. The main object of the catalysts used is to raise the exhaust temperature to a point that could convert the gaseous compounds to safer gaseous emissions. The catalysts undergo chemical reactions which raise the temperature of the exhaust gases allowing them to be converted to the safer gases. One of the major reasons which catalytic material and treatments are used to assist in trap regeneration, is that none of the heating systems attempted, such as diesel fuel burners, electrical heaters and other heaters have been successful. However, if there were a regeneration system in which a converter or trap could be used without a catalyst for regeneration, the above-listed objects would be achieved.

The present invention constitutes the first time such a system has been successfully reduced to practice. Before U.S. Pat. No. 5,279,737, the invention of the technology required in the heating elements for such a system did not exist. This invention uses porous ceramics manufactured by the micropyretic techniques described in U.S. Pat. No. 5,279,737.

U.S. Pat. No. 5,279,737 discloses a process for producing a porous ceramic, ceramic composite or metal-ceramic structure by combustion synthesis wherein a form polymer shape is impregnated with a slurry of ceramic precursors and ignited to initiate combustion synthesis, thereby attaining a ceramic, ceramic composite or metal-ceramic composite article having interconnected porosity. U.S. Pat. No. 5,279,737 is incorporated by reference into the present application.

Nowhere does U.S. Pat. No. 5,279,737 disclose or suggest a modulated filter comprising at least two porous ceramic or ceramic composite modules. The importance of the modulated design lies in the fact that by having a modulated system one can introduce very thin slices of the ceramic filters with pore sizes of 20 to 30 pores per inch, which are more efficient for particle trapping than larger pore sizes, such as 10 pores per inch. Also, if a whole filter trap constituted a single filter unit that was 20 or 30 pores per inch, the pressure drop would be too great and the back pressure would cause engine failure. With the modulated design, however, it is possible to use these pores sizes and insert thin membranes or slices of the filter of different thicknesses to achieve desired results. Some slices can be very thin, but have a very low pore size, for example, 50 pores per inch. A second advantage of the modulated design is that in combination with the heating elements, it is much easier to keep the filters "clean" because smaller pores are generally easier to block and more difficult to clean. In sum, the modulated design allows for an infinite number of variations of the filters and its applications by varying the pore sizes and the thicknesses of the modules as well as the number of modules in the overall filter.

"Regeneration Performance Of A Catalyst Versus Non-Catalyst Ceramic Membrane Diesel Particulate Trap", Rich Helfrich, et al. Global Developments and Diesel Particulate Control P-240 Society of Automotive Engineers, Inc., 121–132 (February 1991), describes a ceramic foam trap system using a parallel flow stacked element design. The individual elements are bonded together to form subassembly of 12 to 14 elements. The ceramic foam filter elements are non-reticulated material with a microporous membrane on a down stream (outer) side of the filter element. The trap itself has a center inlet through which the exhaust flows in the individual elements by way of the annular inlet ports (formed by adjacent elements). The elements in this invention are all the same size and each have the same function. The filtration of the gas in such a system is in a 'parallel' fashion and such a filter system is clearly non-modulated as described and claimed herein.

In the past, it was extremely difficult to incorporate a heating device into a filter because thermal cycling problems from incompatible thermal expansions of the heating element and filter. This made it difficult to have a filter with an integral heating element. The material used for the heating elements are typically molybdenum disilicide based. This material is able to heat to 550° C. in only a few seconds, which combats the well-known problem of cold-start emissions in motor vehicles. Other superior properties include high emissivity of approximately 0.9, as compared to other heating elements which have emissivities of 0.4 to 0.75. The fact that the heating element is integral with the filter provides the advantage of less complexity, less moving parts and less cost. Most other systems depend upon many complex systems including logic and electronics to heat the filter or the exhaust gases, which is very costly and problematic. All materials made by the micropyretic technique experience a large temperature gradient of more than 1000 centimeters per millimeter during manufacture. This includes both filters and heating elements made by micropyretic technique. Due to the extreme conditions that the materials must endure during synthesis, the materials made by the micropyretic technique result in porous ceramics which are extremely thermally shock resistant, highly thermally cyclable and forgiving when contacted with the heating element. Because they possess these qualities, they are extremely well-suited for exhaust aftertreatment systems.

To date, such rapid heating elements were not available. Non micropyretic heating elements even though made principally of molybdenum disilicide or silicon carbide are extremely expensive. Furthermore, they cannot heat as rapidly because they are not manufactured by the micropyretic technique. Another reason why heating elements have not been used in situ with the types of filters most commonly used today, is that the extruded cellular configuration of the presently available filters is ill suited for integral heating elements. The extruded channels made of the ceramic act as an insulator with respect to the other channels. Therefore, one would need many heating elements, one per cellular channel to have an in situ heating configuration, a highly impractical and extremely expensive consideration.

The in situ heating elements would also enhance the catalytic converters already in use, today. Catalytic converters are heated during operation, and the EPA specifies a minimum time in which the catalysis bed must reach operating temperature. The standard solution has been to add an "pup" converter—a second, small converter upstream of the main unit. It acts like an igniter, and heats the exhaust stream rapidly, but little else about them is satisfactory. Even a small converter adds significant costs. It is often difficult to fit even a sizable converter into limited space, and it creates shielding problems by placing another source of intense heat close to engine components. All of these problems are overcome by the integral in situ heating element of the present invention.

Several different methods have been attempted to heat catalytic converters, including miniature radio transmitters that activate a non contact heating device heater, and additional catalysis. The present invention deals with the necessity of heating catalysts without the expense and complexity of the prior art.

There is also a greater need for technological improvements in catalytic converters and other engine emission reduction devices because there is a finite limit to the amount of platinum the most commonly used catalyst. Moreover, platinum is extremely expensive.

The idea of having an in situ heating element within a filter has many applications outside of exhaust systems, as well. One of these applications would be in a simple heating device. One of the major advantages is that the heating element is actually inserted into the filter rather than being supplied from outside the filter.

U.S. Pat. No. 5,094,075, issued Mar. 10, 1992 to Heinrich Berendes, discloses a particulate filter that can be regenerated by means of a burner working in the main engine exhaust stream. Regeneration is achieved by means of a burner to which fuel and oxygen-containing gas is supplied in a variable proportion. By this means, the burner produces the output required to achieve the regeneration temperature in the diesel engine. This patent requires an outside burner, instead of an in situ integral heating element, in order to regenerate the filter.

U.S. Pat. No. 5,015,381, issued May 14, 1991 to M. Edmund Ellion, et al, discloses a fluid filter element, filter, and process for its fabrication, wherein the filter element includes a flat base and a thin layer deposited thereupon having a channels though which a fluid may flow. In operation, the element is pressed against a flat surface. preferably against the backside of another element and a stack of filter elements, wherein the channels become closed conduits. The channels have a minimum requirement of thickness of the layer so that larger particles may not pass therethrough. Fabrication of the thin layer with the channels therein is preferably accomplished by masking a pattern corresponding to the channels and then vapor depositing the remainder of the thin layer, as masking and deposition permits actuated control of the heights of the deposited layer and then the minimum dimension of the channels. This patent does not disclose the modular design nor does it account for regeneration of soot and particulates.

U.S. Pat. No. 5,001,899, issued Mar. 26, 1991 to Enrique Santiago, et al, discloses a method and apparatus for cleaning of a soot filter in the exhaust line of a diesel engine with a combustion chamber placed in front of the soot filter where fuel nozzle and adapted electrical ignition method is built and thereby enabling the afterburning of the exhaust without secondary air. The exhaust in the combustion-chamber is mixed with the fuel which is injected through the fuel nozzle, and ignited by an ignition device with the existing portion of the unburned oxygen. The half exhaust effects the burndown of the accumulated soot in the soot filter. The apparatus disclosed herein is complex and requires many parts and does not teach a simple integral heating element to burn the soot in the filter.

U.S. Pat. No. 4,400,352, issued Aug. 23, 1983 to Ovea Rehnburg, et al, discloses a method and device for optimizing purification of diesel exhaust gases, the purification being carried out by a catalysis. This invention does not disclose modulated design nor does it disclose incorporating a heating element into the filter for regeneration.

"Gassing Truckers", The Economists Newspaper Limited, Business Finance and Science: Science and Technology: Pg. 97 describes a particle trap which works like filters in the exhaust pipe using two traps and switching between them, so one trap filters while the other one burns the collected particles. That article admits, that despite years of research, those traps were still unreliable, strongly indicating the need for reliable particle traps. Although the design described has two separate filter units, it does not teach the modular design of the present invention.

U.S. Pat. No. 5,334,570 discloses a porous catalyst support which may be used in a catalytic converter for treating automotive exhaust gases. The desirability of increasing "open frontal area" available for filtration is recognized. However, no mention or suggestion is made of increasing roughness to achieve this objective.

For the foregoing reasons, there is a need for an aftertreatment system of high effectiveness, low complexity and low cost, as well as a regenerating system incorporating a heating element integral with an exhaust filter, wherein both are highly thermally cyclable.

SUMMARY OF THE INVENTION

The primary goal of the present invention is to provide improved catalytic converters and filters which meet the United States 1994 and 1998 federal, state and local diesel emission regulations.

Yet another goal of the present invention is to initiate and control the regeneration process of a filter to ensure reliable regeneration without damage to the trap oxidizer.

Yet another object of the present invention is to make the filter oxidizers less sensitive to regeneration conditions.

A further object of the present invention is to reduce the overall costs of filters used in exhaust systems A further object of the present invention is to provide a regeneration system in which a converter or a trap oxidizer could be used without the need for using a catalyst for regeneration.

Yet another object of the present invention is to provide a heating element integral with a filter, wherein both are highly thermally cyclable.

A further object of the present invention is to provide a heating element which is formed in situ with the filter.

Yet another object of the present invention is to provide heating elements which heat up extremely rapidly.

In accordance with the first aspect of the present invention, these is provided, a modulated filter for gaseous, liquid and particulate matter wherein the modules in said filter are porous ceramic or ceramic composite structures, said structures having interconnected porosity and having been manufactured using micropyretic synthesis, the filter comprising at least two porous ceramic or ceramic composite modules. Preferably each said module is optimized for extracting different materials.

In accordance with the second aspect of the present invention is provided a regenerator filter comprising a means for filtering and a means for regenerating said means for filtering, said means for regenerating being integral with said filtering means.

BRIEF DESCRIPTION OF THE DRAWINGS

FIG. 1 (b) is an enhanced micrograph of the ceramic structure of FIG. 1 (a);

DETAILED DESCRIPTION OF THE INVENTION

The preferred embodiments of the present invention will now be described in greater detail.

First Embodiment

This aspect of the present invention provides a modulated filter for gaseous, liquid and particulate matter, wherein the modules in said filter are porous ceramic or ceramic composite structures, said structures having interconnected porosity and having been manufactured using micropyretic synthesis, the filter comprising:

at least two porous ceramic or ceramic composite modules.

Optionally, the modulated filter of the present invention also comprises a catalyst, the catalyst being applied to the filter by coating, impregnating and combinations thereof; and wherein the catalyst reacts or is reactive under conditions of vacuum, room temperature, increased temperature, pressure or combinations thereof.

Optionally, each module of the filter is optimized for extracting a different material, particularly, particulates, carbon particles, $NO_x$, CO, $CO_2$, $SO_2$, hydrocarbons, and combinations thereof.

Preferably, the porous ceramic or ceramic composite structure is reticulated. "Reticulated" as used herein refers to a porous 3-dimensional structure without straight-through channels.

Figure 1A:
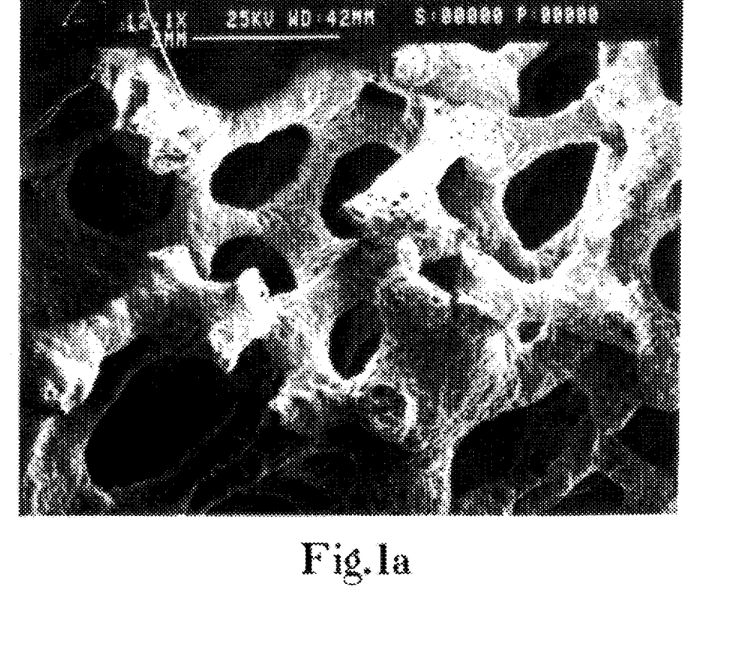
FIG. 1(a) is a micrograph of an $Al_2O_3$—SiC ceramic structure manufactured in accordance with U.S. Pat. No. 5,279,737.
Figure 1B:
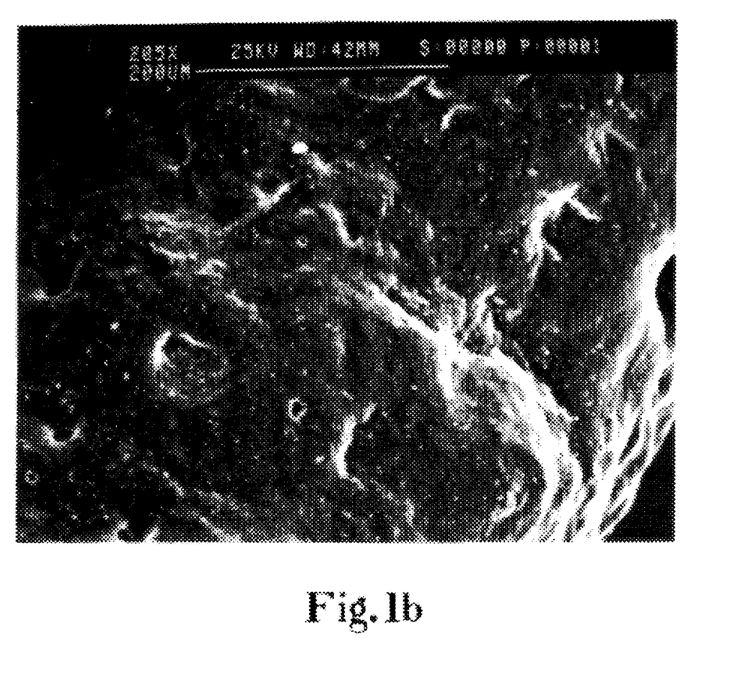

As stated above, the greater the roughness of a filter material, the better the performance of the filter. Therefore, it is preferred that the porous ceramic or ceramic composite structure has a rough surface. A "rough" surface as used herein may be understood as a surface with a high frequency of peaks and valleys, the peaks and valleys creating spaces suited for particle trapping. See FIGS. 1(a) and (b), which illustrate a typical "rough" ceramic composite structure used as modules in the present embodiment. The roughness of the ceramic or ceramic composite structure can be enhanced either chemically or mechanically.

Of the several materials disclosed in the '737 patent, it is preferred that the ceramic or ceramic composite structure comprise a material selected from the group consisting of borides of titanium, zirconium, niobium, tantalum, molybdenum, hafnium, chromium, and vanadium; aluminides (except of aluminum), carbides and oxides of titanium, hafnium, boron, aluminum, tantalum, silicon, tungsten, zirconium, niobium, and chromium; carbonitrides of titanium, niobium, iron, molybdeium, vanadium, and tantalum; nitrides of titanium, zirconium, boron, aluminum, silicon, tantalum, hafnium, and niobium; silicides of molybdenum, titanium, zirconium, niobium, tantalum, tungsten and vanadium; hydrides of titanium, zirconium and niobium; aluminum oxide-titanium boride; titanium carbide-titanium boride; aluminum oxide-titanium boride-titanium nitride; aluminum oxide-titanium boride-titanium carbide; boron carbide-aluminum oxide; molybdenum silicide-aluminum oxide; molybdenum boride-aluminum oxide; chromium carbide-aluminum oxide; vanadium nitride-aluminum oxide and mixtures thereof.

COMPARATIVE EXAMPLE

Figure 2:
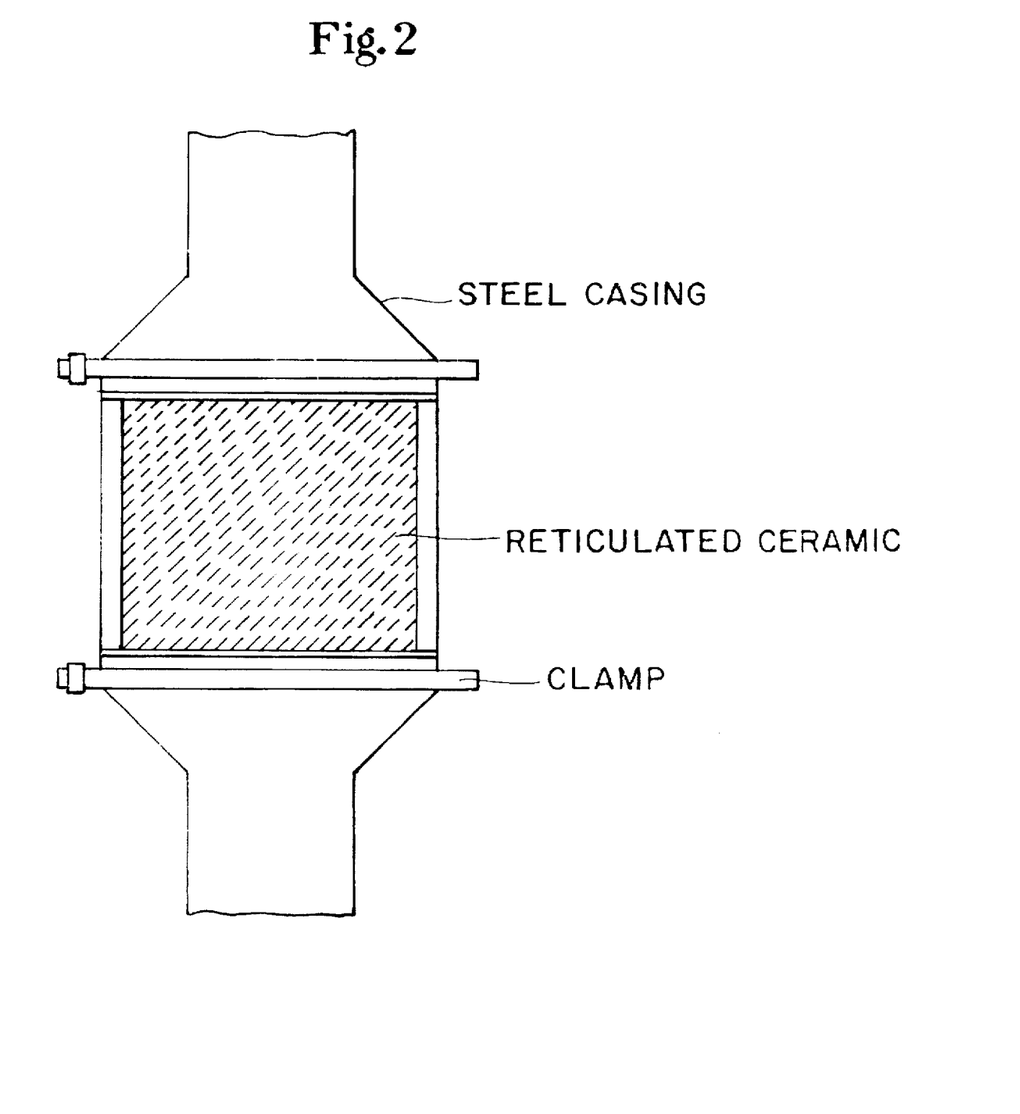
FIG. 2 is a schematic of Filter I as described herein.
Figure 3:
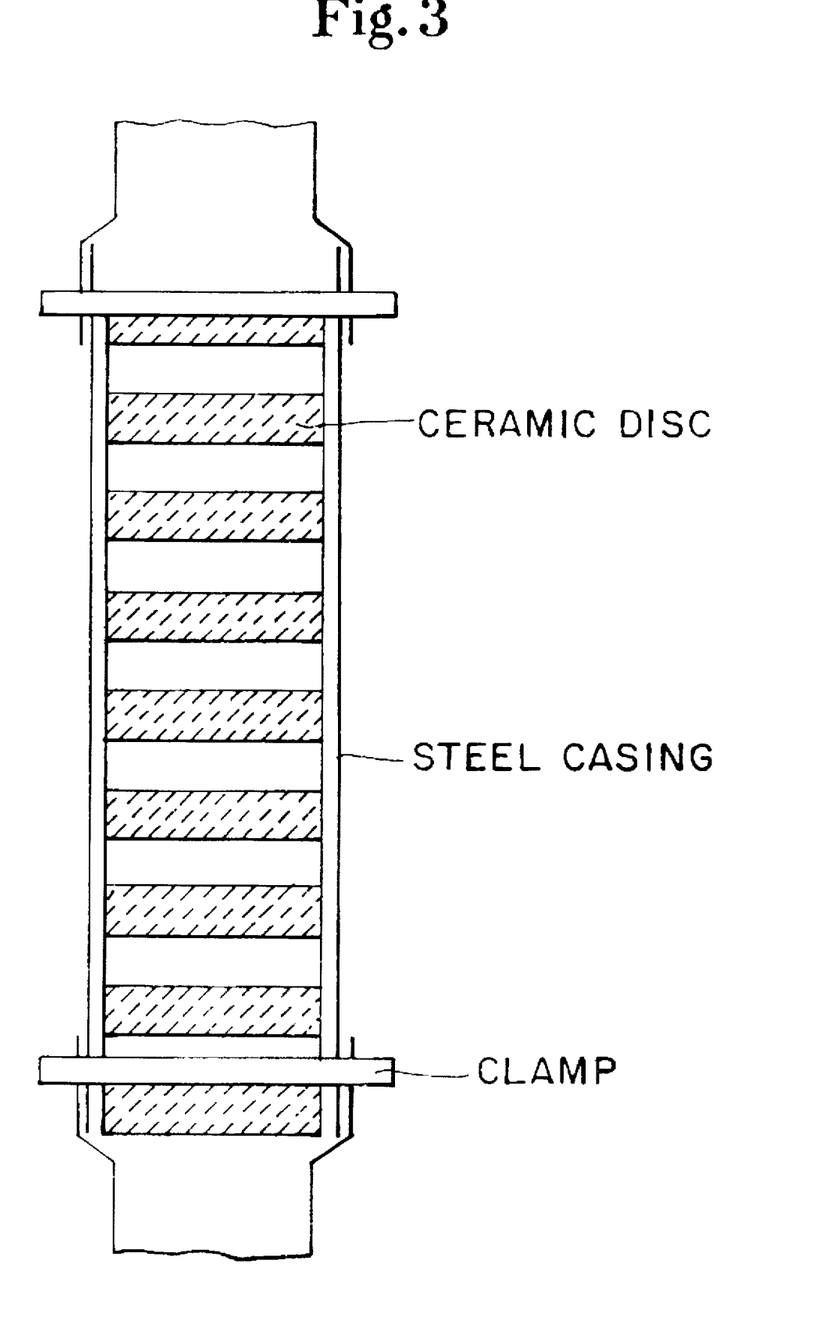
FIG. 3 is a schematic of modulated Filter II as described herein.

Two alumina-silicon carbide ($Al_2O_3$—SiC) filters were made of porous reticulated ceramic fabricated by the process of U.S. Pat. No. 5,279,747. The first filter (I) was made by using a ten pores per inch, cylindrical shaped reticulated ceramic having a 4" diameter and 3" height. The ceramic monolith was packed in a steel casing as shown in FIG. 2. See also, FIG. 10. The second filter (II) was made by stacking nine, ten pores per inch reticulated ceramic discs of 2" diameter and ½" thickness, alternating them with a steel ring ½" long to separate the ceramic discs in a 9" long steel casing, making a modular filter (FIG. 3).

Figure 4:
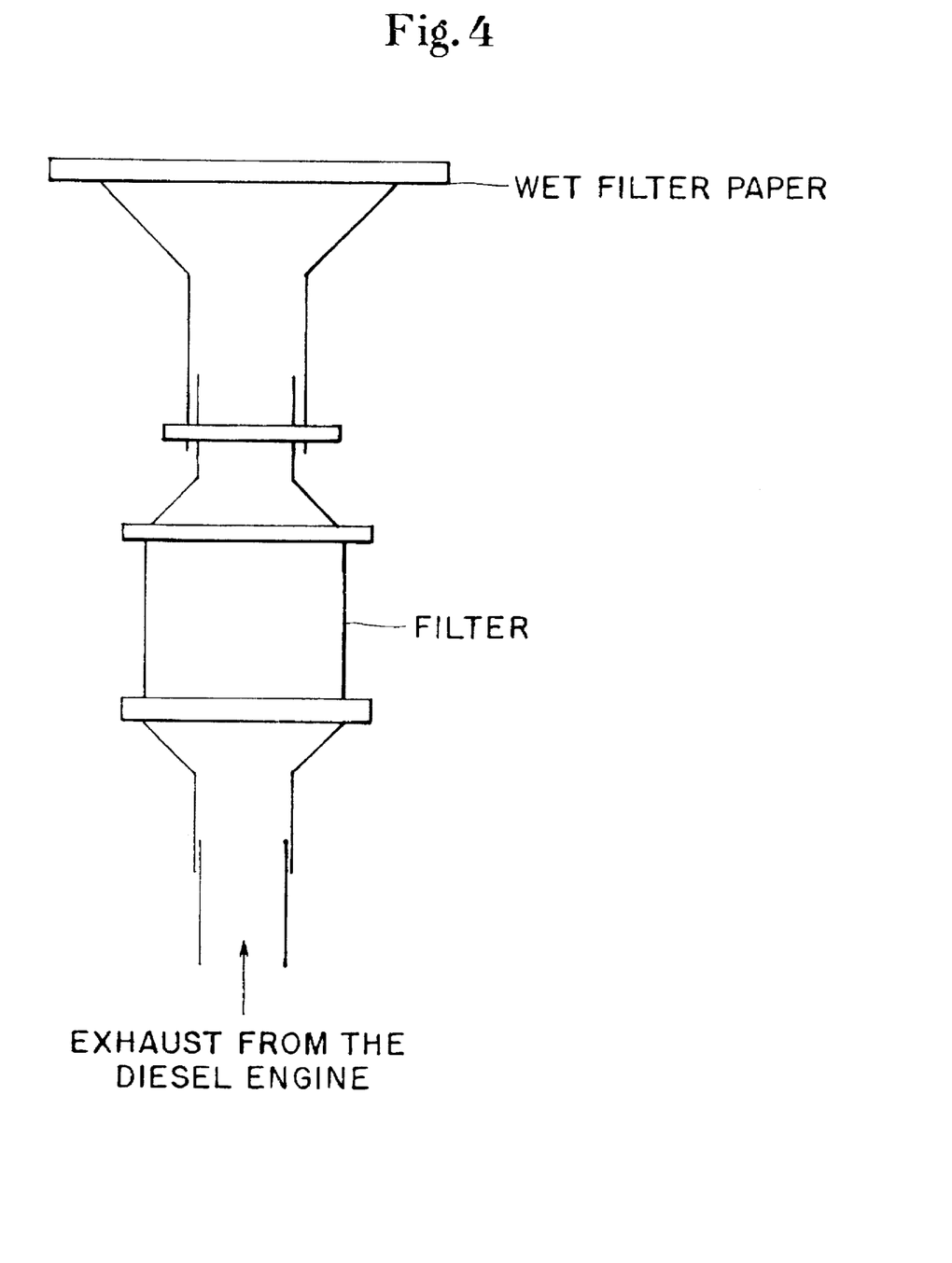
FIG. 4 is a schematic of the test setup used herein for testing filters.

The two particle filters were tested on a diesel engine to compare their performance with the diesel filters available in the market. Engelhard's 3DVC-PTX and 4DVC-PTX diesel filters were used to do the comparison. These filters have a ceramic monolith with square shaped cells, passing straight through the whole body, with a mean wall thickness of 0.15 mm and 14 pores per inch. This ceramic monolith is manufactured by Corning Inc. The setup for the test comprised of a 22 HP four stroke diesel engine made by Lister Petter and a paper holder with a filter paper to catch the particles from the engine exhaust. See FIG. 4. The setup was in the open at an ambient temperature of 40° F. All the four filters I, II, 3DVC and 4DVC were successively tested. Each of these filters were connected to the engine exhaust pipe as shown in the set up. The filter paper was uniformly sprayed with water to enable the exhaust particles to stick to the surface. The engine was started and was run for two minutes for each filter.

Figure 5:
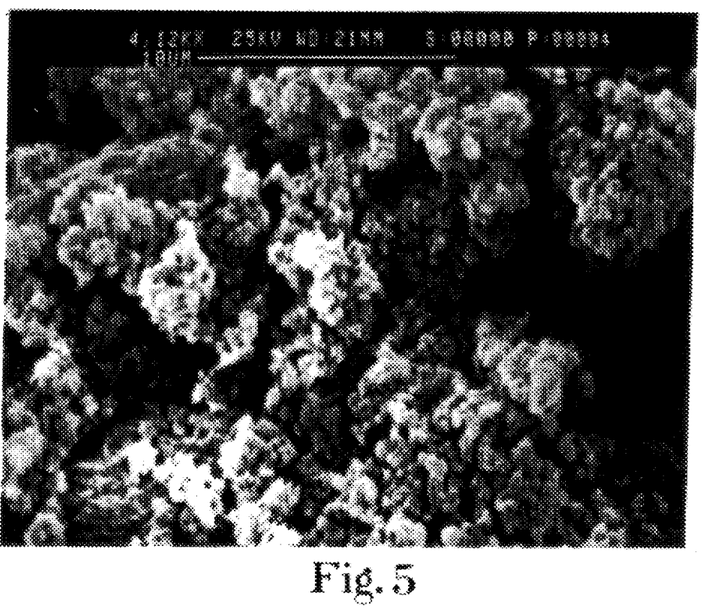
FIG. 5 is a micrograph of the filter paper used to collect the exiting material after filtration by a prior art filter.
Figure 6:
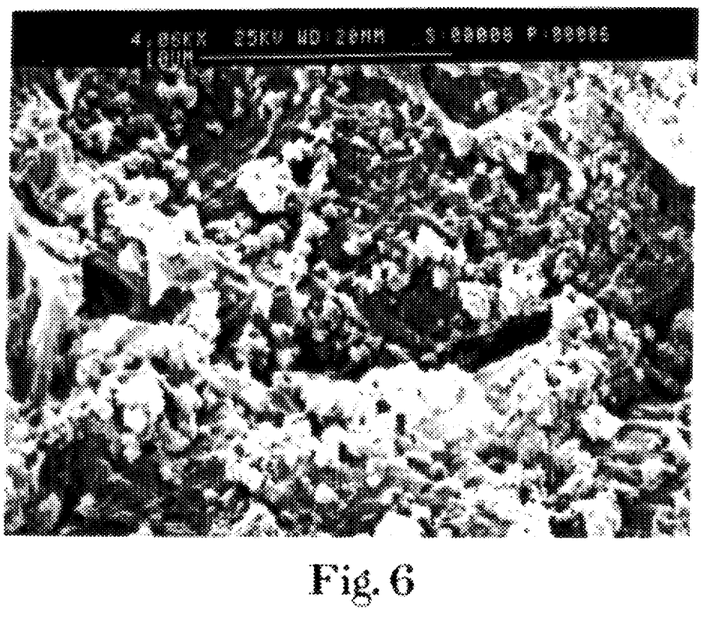
FIG. 6 is a micrograph of the filter paper used to collect the exiting material after filtration by a single module of the present invention.
Figure 7:
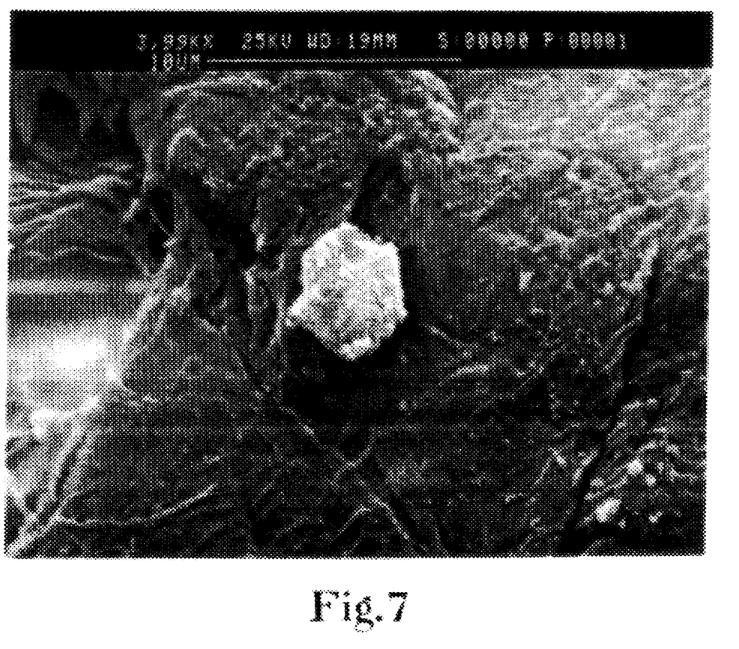
FIG. 7 is a micrograph of the filter paper used to collect the exiting material by a modulated filter in accordance with the present invention.

The gain in weight of the paper, which was used for collecting the particles from the exhaust, and visual inspection, were used as the criterion for determining the performance of the filters. Filter I and Filter 4DVC had exactly the same dimensions. The gain in weight of the filter paper due to the particles collected from the exhaust of Filter I was 0.01 g, where as that from filter 4DVC was 0.03 g. Also the paper used the filter 4DVC was much darker with more black spots than the one used with Filter I. See FIG. 5 which is a micrograph of the filter paper used with 4DVC; FIG. 6 which is a micropyretic of the filter paper used with Filter I; and FIG. 7 which is a micrograph of the filter paper used with Filter II. Thus, it is clearly demonstrated that Filter I is much superior in performance as compared to filter 4DVC.

Filter II was the best filter among the four filters tested. See FIGS. 5, 6 and 7. The gain in weight was negligible and the paper was slightly yellowed with no black spots, suggesting a high degree of filtration.

Second Embodiment

In its broadest form, the second aspect of the present invention provides a regenerative filter comprising: a means for filtering; and a means for regenerating said means for filtering, said means for regenerating being integral with said filtering means.

Preferably, the means for filtering comprises at least one porous ceramic or ceramic composite structure having interconnected porosity and having been manufactured using micropyretic synthesis. Preferably, the means for regenerating is a heating element. Optionally, the regenerating means may also be a catalyst.

The heating element comprises a compound selected from the group consisting of metallic material, molybdenum silicides, Fe—Cr—Al, Ni—Cr, SiC and combinations thereof.

Preferably, the regenerating means (the heating element or catalyst) is formed in situ with the ceramic or ceramic composite filter.

Preferably, the ceramic or ceramic composite is reticulated. The catalyst, if present, is applied to the filter by coating, impregnating, and combinations thereof.

EXAMPLE 1

Figure 8:
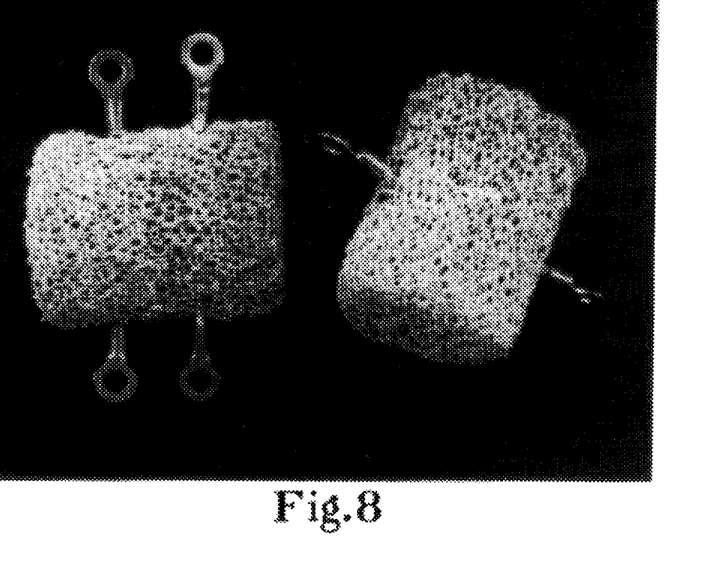
FIG. 8 shows two filters, with one and two heating elements formed in-situ.
Figure 9:
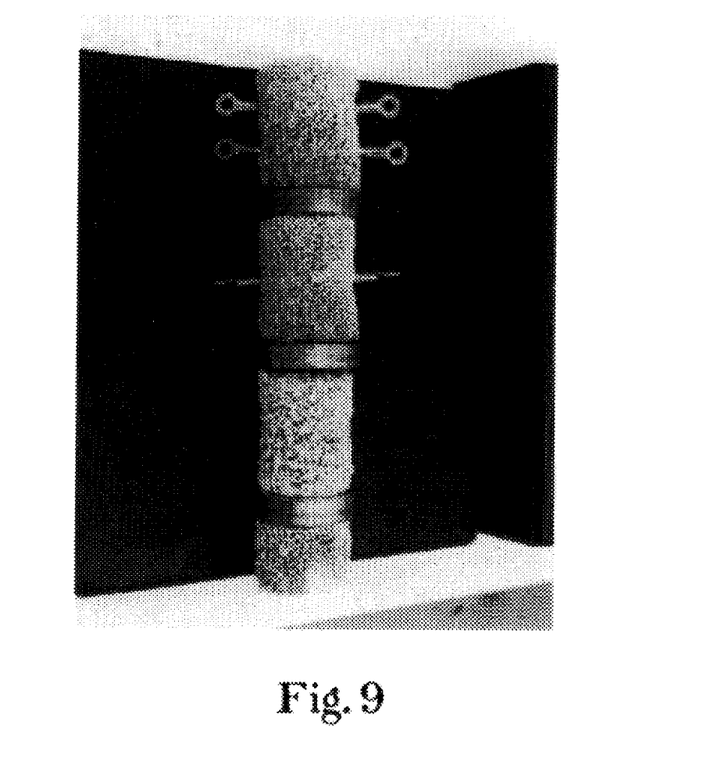
FIG. 9 shows a modulated filter comprising four modules, two with no heating elments, one with one heating element and one with two.
Figure 10:
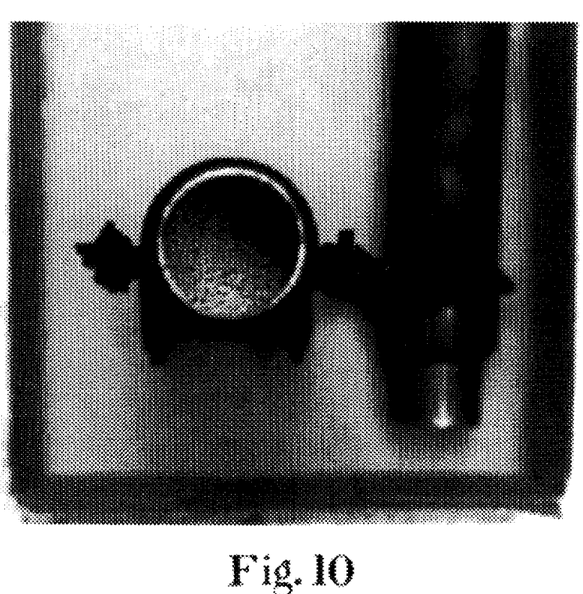
FIG. 10 shows a filter as incorporated within a casing specifically adapted to be fitted in a land based vehicle.
Figure 11:
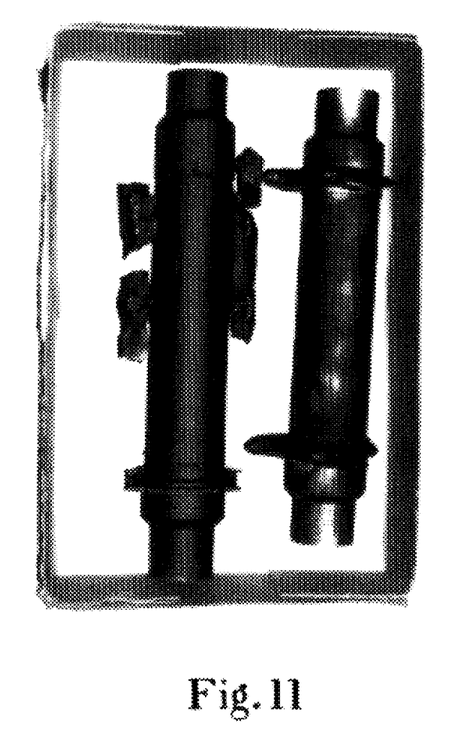
FIG. 11 shows perspective views of the casings having filters incorporated therein, specifically adapted to be fitted in a land based vehicle (the filters are not visible in this view).

A reticulated filter with a pore size of 10 pores per inch manufactured according to U.S. Pat. No. 5,279,737 membrane patent application was made, except that a molybdenum disilicide heating element with terminals were incorporated into the reticulated filter prior to combusting the sample. See, FIG. 8 which shows two filters, with one and two heating elements formed in-situ. The final material of the filter was a composite of $Al_2O_3/SiC$ when used as a particle trap for exhaust gases was found to effectively trap particulates. The heating element could be energized during use and after use as a particle trap to burn off the carbon deposit. Many such filters of size three inches in diameter and two inches in depth could be used in tandem to give a modulated filter of greater length. See, FIG. 9, which shows a modulated filter comprising four modules, two with no heating elments, one with one heating element and one with two. FIG. 10 shows a filter as incorporated within a casing specifically adapted to be fitted in a land based vehicle. FIG. 11 shows perspective views of the casings having filters incorporated therein, specifically adapted to be fitted in a land based vehicle (the filters are not visible in this view).

EXAMPLE 2

A filter with a porous size of five pores per inch, otherwise the same as example one.

EXAMPLE 3

Same as example one expect the filter had various slurry coatings of nickel compounds (both combustible and non-combustible slurry coatings) applied thereto.

EXAMPLE 4

Same as example one expect the filter had various coatings of platinum, ruthenium, iron, titanium, palladium compounds applied thereto.

EXAMPLE 5

The heating element was made of silicon carbide, otherwise the same as example 2.

EXAMPLE 6

The filter was made according to Example 2, but heating element was of a conventional metallic material such as Fe—Cr—Al alloy or NiCr alloy. However, the heating elements made from molybdenum disilicides were found preferable.

EXAMPLE 7

A commercially available cordierite filter for exhaust gases were incorporated with a 3 mm high resistivity heating element manufactured by Micropyretics Heaters International under the trade name HR-1550. The system was heated by passing current through the heating element so as to heat the heating element to at least 700° C.

Advantageously, the modulated filter aspect of the present invention may be used in a land-based vehicle, water-based vehicle, in power generation equipment or in an industrial engine. Similarly, the regenerative filter aspect of the present invention may also be used advantageously in a land-based vehicle, water-based vehicle, in power generation equipment or in an industrial engine. More generally, the modulated filter aspect of the present invention may be used in a regenerative exhaust system. Similarly, the regenerative filter aspect of the present invention may also be used in a regenerative exhaust system. Analogously, the modulated filter aspect can be used in a catalytic converter.

Thus, it is apparent that there have been provided, in accordance with the present invention, modulated and/or regenerative filters, with or without an in situ hating element. These filter devices fully satisfy the aspects and objects of the present invention as set forth above. While the invention has been described in conjunction with specific embodiments thereof, it is evident that many alternatives, modifications and variations will be apparent to those skilled in the art in light of the foregoing description and examples. Accordingly, it is intended to embrace all such alternatives, modifications and variations which fall within the spirit and broad scope of the appended claims.

We claim:

1. A regenerative filter comprising:
 a means for filtering; and
 a means for regenerating said means for filtering, said means for regenerating being integral with said filtering means, wherein said means for filtering comprises at least two porous ceramic or ceramic composite modules having interconnected porosity and having been manufactured using micropyretic synthesis.

2. The regenerative filter of claim 1, wherein said regenerating means is formed in situ with said filtering means.

3. The regenerative filter of claim 1, wherein said means for filtering comprises a ceramic structure with pores which are straight-through.

4. The regenerative filter of claim 1, wherein said ceramic or ceramic composite structure is reticulated.

5. The regenerative filter of claim 1, wherein the means for regenerating comprises a catalyst.

6. The regenerative filter of claim 5, wherein the catalyst is applied to the filter by a method selected from the group consisting of coating, impregnating, and combinations thereof.

7. The regenerative filter of claim 5, wherein the catalyst can react or be reactive under conditions of vacuum, room temperature, increased temperature, pressure or combinations thereof.

8. The regenerative filter of claim 1, wherein said means for regenerating comprises a heating element.

9. The regenerative filter of claim 8, wherein said heating element is formed in situ with said filtering means.

10. The regenerative filter of claim 8, wherein said heating element comprises a compound selected from the group consisting of metallic material, molysilicides, Fe—Cr—Al, Ni—Cr, SiC and combinations thereof.

11. The regenerative filter of claims 8, 9, or 10, wherein said heating element is a high resistivity heating element.

12. In a land-based vehicle, water-based vehicle, in power generation equipment or in an industrial engine, said vehicle, equipment or engine, including a body and an exhaust system, the improvement comprising: a regenerative filter in the exhaust system comprising a means for filtering and a means for regenerating said means for filtering, said means for regenerating being integral with said filtering means, wherein said means for filtering comprises at least two porous ceramic or ceramic composite modules having interconnected porosity and having been manufactured using micropyretic synthesis.

13. The improvement of claim 12, wherein said regenerating means is formed in situ with said filtering means.

14. The improvement of claim 12, wherein said ceramic or ceramic composite structure is reticulated.

15. The improvement of claim 12, wherein said means for regenerating comprises a heating element.

16. The improvement of claim 15, wherein said heating element is formed in situ with said filtering element.

17. The improvement of claim 15, wherein said heating element comprises a compound selected from the group consisting of metallic material, molysilicides, Fe—Cr—Al, Ni—Cr, SiC and combinations thereof.

18. The regenerative filter of claims 15, 16, or 17, wherein said heating element is a high resistivity heating element.

19. In a regenerative exhaust system, the improvement comprising:
 a regenerative filter comprising a means for filtering, and a means for regenerating said means for filtering, said means for regenerating being integral with said filtering means, wherein said means for filtering comprises at least two porous ceramic or ceramic composite modules having interconnected porosity and having been manufactured using micropyretic synthesis.

20. The improvement of claim 19, wherein said regenerating means is formed in situ with said filtering means.

21. The improvement of claim 19, wherein said ceramic or ceramic composite structure is reticulated.

22. The improvement of claim 19, wherein said means for regenerating comprises a heating element.

23. The improvement of claim 22, wherein said heating element is formed in situ with said filtering means.

24. The improvement of claim 22, wherein said heating element comprises a compound selected from the group consisting of metallic material, molysilicides, Fe—Cr—Al, Ni—Cr, SiC and combinations thereof.

25. The regenerative filter of claims 23 or 24, wherein said heating element is a high resistivity heating element.

* * * * *